United States Patent
Shinotani et al.

(10) Patent No.: US 8,851,392 B2
(45) Date of Patent: Oct. 7, 2014

(54) TWO-DIMENSIONAL CODE DISPLAY APPARATUS, TWO-DIMENSIONAL CODE DISPLAY METHOD, AND PROGRAM

(75) Inventors: Tomoko Shinotani, Tokyo (JP); Takuya Kamiaka, Tokyo (JP)

(73) Assignee: A.T Communications Co., Ltd., Tokyo (JP)

( * ) Notice: Subject to any disclaimer, the term of this patent is extended or adjusted under 35 U.S.C. 154(b) by 0 days.

(21) Appl. No.: 13/202,856

(22) PCT Filed: Nov. 9, 2009

(86) PCT No.: PCT/JP2009/069060
§ 371 (c)(1),
(2), (4) Date: Aug. 23, 2011

(87) PCT Pub. No.: WO2010/097989
PCT Pub. Date: Sep. 2, 2010

(65) Prior Publication Data
US 2011/0303754 A1    Dec. 15, 2011

(30) Foreign Application Priority Data
Feb. 27, 2009   (JP) ................................. 2009-045627

(51) Int. Cl.
*G06K 19/06*    (2006.01)
*H04L 29/08*    (2006.01)
*G06K 19/14*    (2006.01)
*G06K 7/10*    (2006.01)

(52) U.S. Cl.
CPC ................ *G06K 19/14* (2013.01); *H04L 67/04* (2013.01); *G06K 19/06112* (2013.01); *G06K 19/06103* (2013.01); *G06K 7/1095* (2013.01)
USPC ......................................................... 235/494

(58) Field of Classification Search
USPC .......................................................... 235/494
See application file for complete search history.

(56) References Cited

U.S. PATENT DOCUMENTS

| | | | | |
|---|---|---|---|---|
| 7,546,949 | B1 * | 6/2009 | Blanford | 235/462.07 |
| 7,637,436 | B1 * | 12/2009 | Anderson | 235/494 |
| 2004/0118923 | A1 * | 6/2004 | Creamer et al. | 235/462.01 |

(Continued)

FOREIGN PATENT DOCUMENTS

| | | |
|---|---|---|
| JP | 2004-164532 A | 6/2004 |
| JP | 3115023 U | 11/2005 |

(Continued)

OTHER PUBLICATIONS

International Search Report (in Japanese with English translation) for PCT/JP2009/069060 mailed Dec. 8, 2009; ISA/JP.

*Primary Examiner* — Thien M Le
*Assistant Examiner* — Asifa Habib
(74) *Attorney, Agent, or Firm* — Harness, Dickey & Pierce, P.L.C.

(57) ABSTRACT

The display unit displays a QR Code (registered trademark) (21), a Data Matrix (Data Code) (22), and an Aztec Code (23), all presenting the same information such as flight reservation details, for example, for 1.0 second each by turns. Consequently, there is no need of installing a two-dimensional code reader for QR Code (registered trademark), a two-dimensional code reader for Data Matrix (Data Code), and a two-dimensional code reader for Aztec Code and only any one of the two-dimensional code readers is necessary to read information such as flight reservation details.

7 Claims, 7 Drawing Sheets

(56) References Cited

U.S. PATENT DOCUMENTS

| | | | |
|---|---|---|---|
| 2005/0248471 A1* | 11/2005 | Ryu | 341/1 |
| 2005/0263598 A1* | 12/2005 | Harada | 235/462.09 |
| 2006/0071076 A1* | 4/2006 | Tamayama | 235/454 |
| 2006/0098241 A1* | 5/2006 | Cheong et al. | 358/463 |
| 2007/0016936 A1* | 1/2007 | Okada et al. | 725/136 |
| 2007/0051813 A1* | 3/2007 | Kiuchi et al. | 235/462.1 |
| 2009/0108056 A1* | 4/2009 | Faust et al. | 235/375 |
| 2009/0207101 A1* | 8/2009 | Noguchi et al. | 345/55 |
| 2010/0007666 A1* | 1/2010 | Nohara et al. | 345/501 |
| 2010/0114680 A1* | 5/2010 | Steelberg et al. | 705/14.4 |
| 2010/0259549 A1* | 10/2010 | Brown et al. | 345/589 |

FOREIGN PATENT DOCUMENTS

| | | |
|---|---|---|
| JP | 2006-042216 A | 2/2006 |
| JP | 2006-295898 A | 10/2006 |
| JP | 2007-241538 A | 9/2007 |

\* cited by examiner

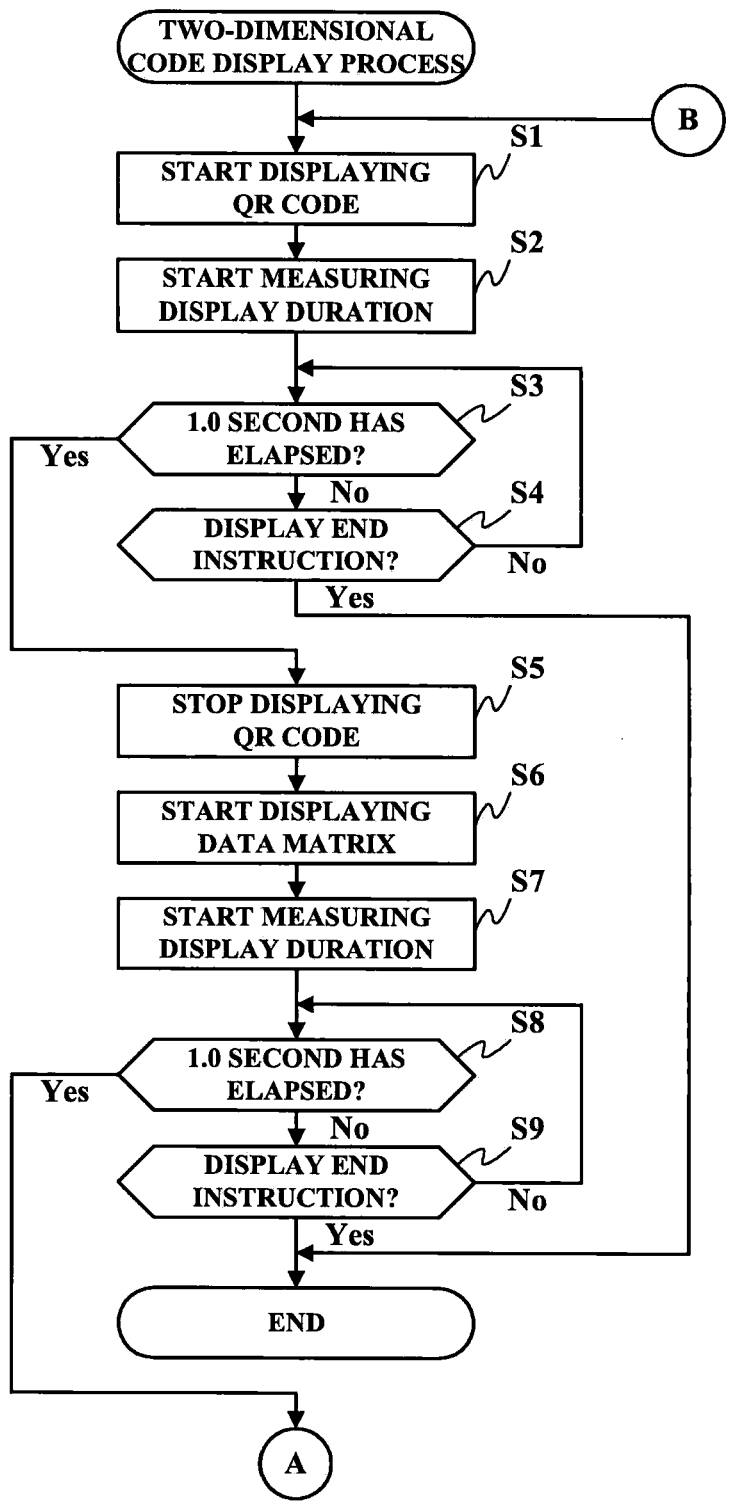

TWO-DIMENSIONAL CODE DISPLAY APPARATUS, TWO-DIMENSIONAL CODE DISPLAY METHOD, AND PROGRAM

CROSS-REFERENCE TO RELATED APPLICATIONS

This application is a 371 U.S. National Stage of International Application No. PCT/JP2009/069060, filed Nov. 9, 2009. This application claims priority to Japanese Patent Application No. 2009-045627, filed Feb. 27, 2009. The disclosures of the above applications are incorporated herein by reference.

TECHNICAL FIELD

The present invention relates to a two-dimensional code display apparatus, a two-dimensional code display method, and a program for displaying two-dimensional codes that can be read without using multiple kinds of two-dimensional code readers working with different standards.

BACKGROUND ART

Recently, as air tickets have increasingly gone paperless, instead of showing a paper on which the reservation details are printed to a service agent at the counter, the passengers simply place a two-dimensional code presenting the reservation details stored in a mobile communication terminal such as a cell-phone over a two-dimensional code reader installed at the airport to have various authentication procedures done (for example, see Patent Literature 1).

Patent Literature 1: Unexamined Japanese Patent Application KOKAI Publication No. 2007-241538.

DISCLOSURE OF INVENTION

Problem to be Solved by the Invention

However, air tickets having such two-dimensional codes are used only in Japan domestic flight boarding processing. This is because as two-dimensional codes, QR Code (registered trademark) is primarily used in Japan while Data Matrix (Data Code) or Aztec Code is used in Europe and the United States. Two-dimensional code readers for Data Code or Aztec Code at overseas airports cannot read the details in QR Code (registered trademark) on air tickets issued in Japan.

Conversely, two-dimensional code readers for QR Code (registered trademark) at Japanese airports cannot read the details in Data Matrix (Data Code) or Aztec Code on air tickets issued overseas.

Therefore, if an air ticket having a two-dimensional code is applied to overseas flight boarding processing, a two-dimensional code reader for QR Code (registered trademark), a two-dimensional code reader for Data Matrix (Data Code), and a two-dimensional code reader for Aztec Code should be installed at an airport, which is not practical from the viewpoint of installation cost and installation space.

The present invention is meant to resolve the above problem and an exemplary object of the present invention is to provide a two-dimensional code display apparatus, two-dimensional code display method, and a program for displaying two-dimensional codes that can be read without using multiple kinds of two-dimensional code readers working with different standards.

Means for Solving the Problem

In order to achieve the above object, the two-dimensional code display apparatus according to a first exemplary aspect of the present invention comprises:

a display means capable of displaying two-dimensional codes presenting given information; and a display control means controlling display of multiple kinds of two-dimensional codes presenting the same information in compliance with different standards on the display means in the manner that they are displayed by turns.

In the above two-dimensional code display apparatus, possibly, the display control means controls display of multiple kinds of two-dimensional codes presenting the same information in compliance with different standards and a given image on the display means in the manner that they are displayed by turns.

Furthermore, in the above two-dimensional code display apparatus, possibly, the display control means controls display of multiple kinds of two-dimensional codes presenting the same information in compliance with different standards and an image corresponding to the information presented by the two-dimensional codes on the display means in the manner that they are displayed by turns.

Furthermore, in the above two-dimensional code display apparatus, possibly, the display means displays image-added two-dimensional codes in which a two-dimensional code presenting given information is superimposed on a given image; and the display control means controls display of multiple kinds of image-added two-dimensional codes presenting the same information in compliance with different standards on the display means in the manner that they are displayed by turns.

The two-dimensional code display method according to a second exemplary aspect of the present invention controls display of multiple kinds of two-dimensional codes presenting the same information in compliance with different standards on a display means in the manner that they are displayed by turns.

The program according to a third exemplary aspect of the present invention allows a computer comprising a display means capable of displaying two-dimensional codes presenting given information to execute control on display of multiple kinds of two-dimensional codes presenting the same information in compliance with different standards on the display means in the manner that they are displayed by turns.

Effect of the Invention

The present invention can provides a two-dimensional code display apparatus, two-dimensional code display method, and program for displaying two-dimensional codes that can be read without using multiple kinds of two-dimensional code readers working with different standards.

BRIEF DESCRIPTION OF DRAWINGS

FIG. 3 is a flowchart showing an exemplary two-dimensional code display process;

BEST MODE FOR CARRYING OUT THE INVENTION

The best mode of the present invention is described hereafter.

Figure 1:
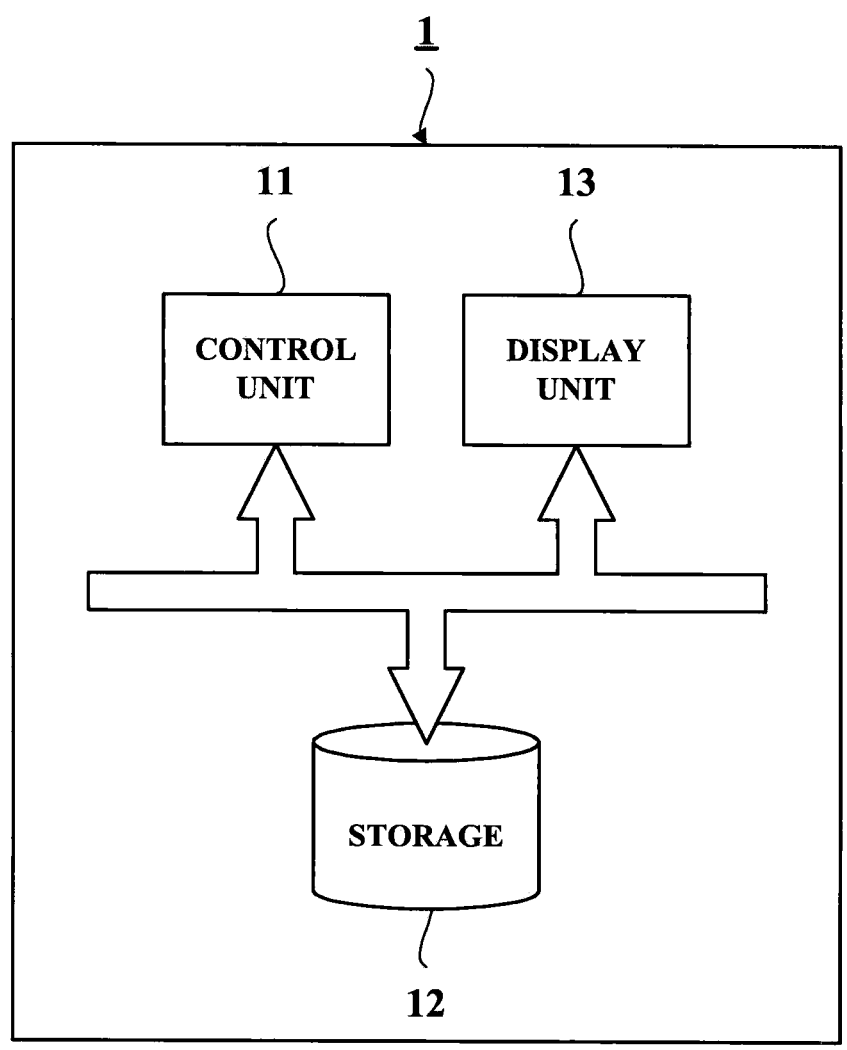
FIG. 1 is a block diagram showing an exemplary configuration of the two-dimensional code display apparatus.

First, a two-dimensional code display apparatus 1 according to an embodiment will be described with reference to the drawings. The two-dimensional code display apparatus 1 is configured by, for example, a general-purpose computer or a mobile communication terminal such as a cell-phone. The two-dimensional code display apparatus 1 comprises, as shown in FIG. 1, a control unit 11, a storage 12, and a display unit 13, which are connected to each other via a bus.

The control unit 11 is composed of, for example, a CPU (central processing unit), a ROM (read only memory), and a RAM (random access memory). The CPU executes various programs stored in the ROM or the storage 12 as appropriate using the RAM as the work memory, whereby the control unit 11 controls the operations of the parts of the two-dimensional code display apparatus 1. In this embodiment, the RAM has a display duration timer measuring the display duration of an image or a two-dimensional code.

The storage 12 is composed of, for example, a hard disc drive or flash memory. An OS (operation system) and various application programs are stored in the storage 12. In this embodiment, a two-dimensional code display program displaying multiple kinds of two-dimensional codes presenting the same information in compliance with different standards by turns is stored in the storage 12.

The display unit 13 is composed of, for example, an LCD (liquid crystal display). The display unit 13 displays images for executing various operations of the two-dimensional code display apparatus 1 and various kinds of two-dimensional codes presenting the same information in compliance with different standards by turns under the control of the control unit 11.

Figure 2A:
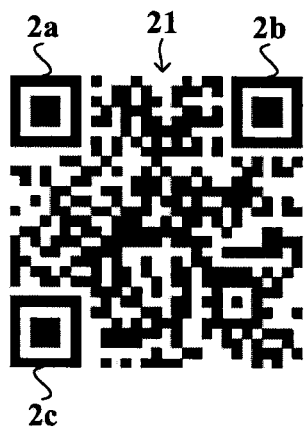
FIG. 2A to 2C are plane views showing exemplary two-dimensional codes.
Figure 2B:
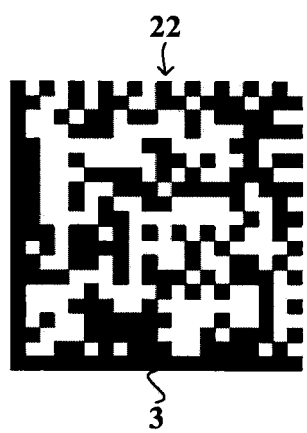
Figure 2C:
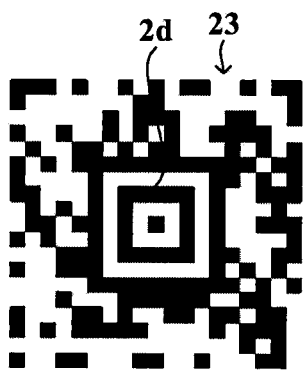

In this embodiment, the display unit 13 displays a QR Code (registered trademark) 21, a Data Matrix (Data Code) 22, and an Aztec Code 23, all presenting the same flight reservation details, as shown in FIGS. 2A to 2C for a given period of time each by turns as multiple kinds of two-dimensional codes. Here, the given period of time for which the QR Code (registered trademark) 21, Data Matrix (Data Code) 22, and Aztec Code 23 are each displayed is the enough time for a two-dimensional code reader working with each standard to read the information presented by the code displayed on the display unit 13 (for example, 1.0 second) or longer.

FIG. 2A is a plane view showing a QR Code (registered trademark) 21. The QR Code (registered trademark) 21 has, as shown in FIG. 2A, three positioning symbols 2a, 2b, and 2c consisting of a combination of squares with a specific ratio. Then, multiple, for example square, cells are provided in a matrix between the positioning symbols 2a, 2b, and 2c.

FIG. 2B is a plane view showing a Data Matrix (Data Code) 22. The Data Matrix (Data Code) 22 consists of multiple, for example square, cells arranged in a matrix within an L-shaped frame 3 as shown in FIG. 2B.

FIG. 2C is a plane view showing an Aztec Code 23. The Aztec Code 23 has a square positioning symbol 2d with a specific ratio at the center as shown in FIG. 2C. Then, multiple, for example square, cells are arranged in a matrix around the positioning symbol 2d.

In this embodiment, the QR Code (registered trademark) 21, Data Matrix (Data Code) 22, and Aztec Code 23 present the same information, for example flight reservation details, each by using a distribution pattern of regions having a luminosity equal to or higher than a given value and regions having a luminosity lower than the given value, which is created by filling the cells with a color having a luminosity equal to or higher than a given value (for example, white) or with a color having a luminosity lower than the given value (for example, black).

More specific operation of the two-dimensional code display apparatus 1 having the above configuration will be described hereafter with reference to the drawings.

Figure 4:
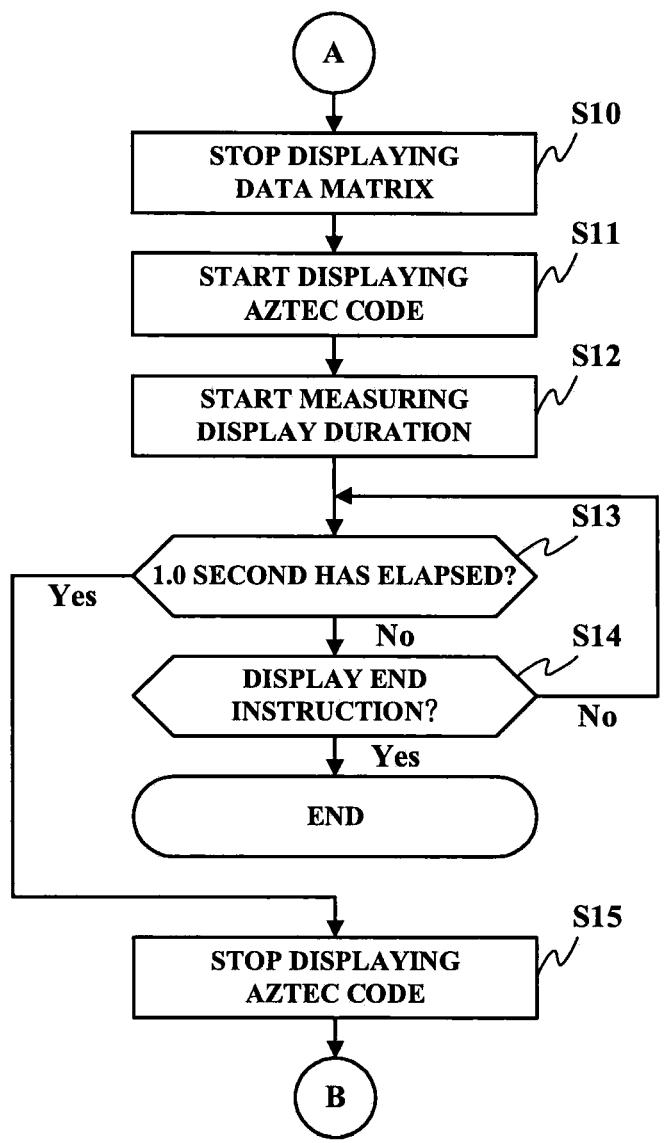
FIG. 4 is a flowchart showing an exemplary two-dimensional code display process.

In response to entry of a two-dimensional code display start instruction, for example, through operation of the user on the two-dimensional code display apparatus 1, the control unit 11 activates the two-dimensional code display program stored in the storage 12 to start a two-dimensional code display process as shown in FIGS. 3 and 4.

Figure 5:
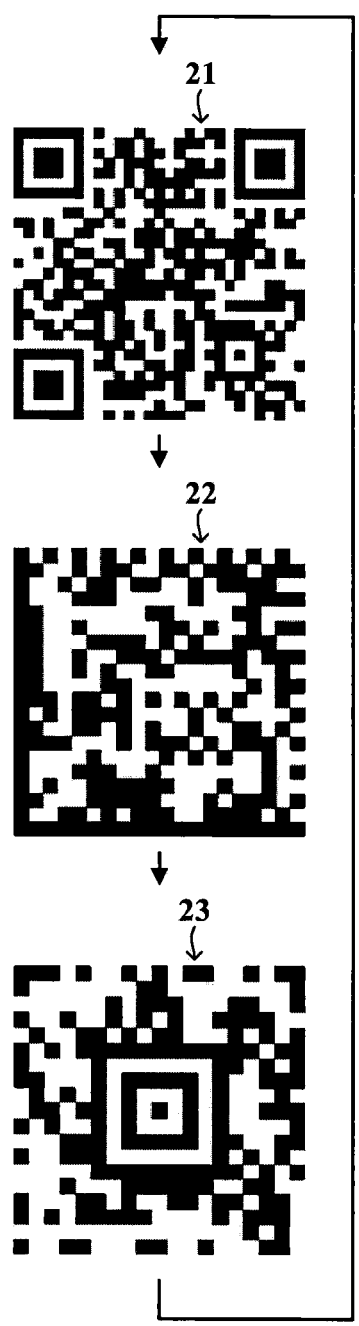
FIG. 5 is a plane view showing an exemplary image display of the two-dimensional display apparatus.

In the two-dimensional code display process, first, the control unit 11 starts displaying the QR Code (registered trademark) 21 shown in FIG. 5 (Step S1 in FIG. 3). Along with this operation, the control unit 11 sets the display duration timer provided in the RAM to a timer initial value corresponding to, for example, 1.0 second and then starts measuring the display duration of the QR Code (registered trademark) 21, for example, by decreasing the display duration timer (Step S2).

Then, the control unit 11 checks as to whether the display duration timer has reached a timer value "0" to determine whether 1.0 second has elapsed since the display of the QR Code (registered trademark) 21 started (Step S3). If 1.0 second has not elapsed since the display of the QR Code (registered trademark) 21 started (Step S3; No), the control unit 11 determines whether a two-dimensional code display end instruction is entered, for example, through operation of the user on the two-dimensional code display apparatus 1 (Step S4).

Then, if no two-dimensional code display end instruction is entered (Step S4; No) and 1.0 second has elapsed since the display of the QR Code (registered trademark) 21 started (Step S3; Yes), the control unit 11 stops displaying the QR Code (registered trademark) 21 (Step S5). Along with this operation, the control unit 11 starts displaying the Data Matrix (Data Code) 22 presenting the same information (flight reservation details in this embodiment) as the QR Code (registered trademark) 21 as shown in FIG. 5 (Step S6).

Consequently, the display unit 13 switches the display of the QR Code (registered trademark) 21 to the display of the Data Matrix (Data Code) 22 presenting the same information (flight reservation details in this embodiment) as the QR Code (registered trademark) 21. Furthermore, the control unit 11 sets the display duration timer to a timer initial value corresponding to, for example, 1.0 second and then starts measuring the display duration of the Data Matrix (Data Code) 22, for example, by decreasing the display duration timer (Step S7).

Then, the control unit 11 checks as to whether the display duration timer has reached a timer value "0" to determine whether 1.0 second has elapsed since the display of the Data Matrix (Data Code) 22 started (Step S8). If 1.0 second has not elapsed since the display of the Data Matrix (Data Code) 22 started (Step S8; No), the control unit 11 determines whether a two-dimensional code display end instruction is entered (Step S9).

Then, if no two-dimensional code display end instruction is entered (Step S9; No) and 1.0 second has elapsed since the display of the Data Matrix (Data Code) 22 started (Step S8;

Yes), the control unit 11 stops displaying the Data Matrix (Data Code) 22 (Step S10 in FIG. 4). Along with this operation, the control unit 11 starts displaying the Aztec Code 23 presenting the same information (flight reservation details in this embodiment) as the Data Matrix (Data Code) 22 as shown in FIG. 5 (Step S11).

Consequently, the display unit 13 switches the display of the Data Matrix (Data Code) 22 to the display of the Aztec Code 23 presenting the same information (flight reservation details in this embodiment) as the Data Matrix (Data Code) 22. Furthermore, the control unit 11 sets the display duration timer to a timer initial value corresponding to, for example, 1.0 second and then starts measuring the display duration of the Aztec Code 23, for example, by decreasing the display duration timer (Step S12).

Then, the control unit 11 checks as to whether the display duration timer has reached a timer value "0" to determine whether 1.0 second has elapsed since the display of the Aztec Code 23 started (Step S13). If 1.0 second has not elapsed since the display of the Aztec Code 23 started (Step S13; No), the control unit 11 determines whether a two-dimensional code display end instruction is entered (Step S14).

Then, if no two-dimensional code display end instruction is entered (Step S14; No) and 1.0 second has elapsed since the display of the Aztec Code 23 started (Step S13; Yes), the control unit 11 stops displaying the Aztec Code 23 (Step S15). Along with this operation, the control unit 11 returns to the operation of Step S1 in FIG. 3. Consequently, the display unit 13 switches the display of the Aztec Code 23 to the display of the QR Code (registered trademark) 21 presenting the same information (flight reservation details in this embodiment) as the Aztec Code 23.

On the other hand, if a two-dimensional code display end instruction is entered in Step S4 or S9 or in Step S14 of FIG. 4 (Step S4; Yes, Step S9; Yes, or Step S14; Yes), the control unit 11 ends the two-dimensional code display process.

As described above, the two-dimensional code display apparatus 1 according to this embodiment can display the QR Code (registered trademark) 21, Data Matrix (Data Code) 22, and Aztec Code 23, all presenting the same information such as flight reservation details, on the display unit 13, for example, for 1.0 second each by turns. Consequently, there is no need of installing a two-dimensional code reader for QR Code (registered trademark), a two-dimensional code reader for Data Matrix (Data Code), and a two-dimensional code reader for Aztec Code, and only any one of the two-dimensional code readers is necessary to read information such as flight reservation details.

The present invention is not restricted to the above embodiment and various modifications and applications can be made. Modifications in the above embodiment that are applicable to the present invention will be described hereafter.

In the above embodiment, two-dimensional codes used for various authentication necessary for boarding such as two-dimensional codes presenting flight reservation details are given by way of example. However, the present invention is not restricted thereto and is applicable to two-dimensional codes used, for example, in domestic or overseas promotion of commercial products.

Figure 6A:
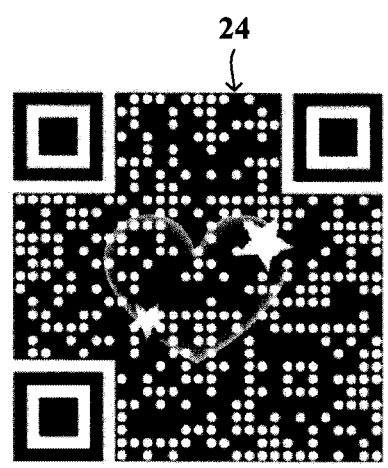
FIG. 6A and 6B are plane views showing exemplary image-added two-dimensional codes.
Figure 6B:
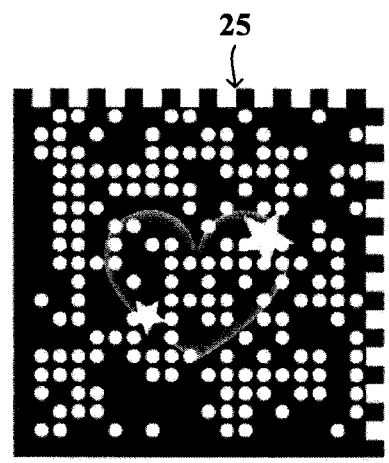

In the above embodiment, two-dimensional codes present given information by using a distribution pattern of the cells in a color of a luminosity equal to or higher than a given value (for example, white) and the cells in a color of a luminosity lower than the given value (for example, black), which is created by filling the cells with a color having a luminosity equal to or higher than a given value (for example, white) or with a color having a luminosity lower than the given value (for example, black). The present invention is not restricted thereto. The two-dimensional code display apparatus 1 can display an image-added two-dimensional code as shown in FIG. 6 in which cells having a luminosity lower than a given value are superimposed on the part having a luminosity equal to or higher than a given value of an image visibly presenting for example a logo, and cells having a luminosity equal to or higher than the given value are superimposed on the part having a luminosity lower than the given value. In such an image-added two-dimensional code, given information is presented by the distribution pattern of the part having a luminosity lower than a given value of the image/the cells having a luminosity lower than a given value and the part having a luminosity equal to or higher than the given value of the image/the cells having a luminosity equal to or higher than the given value. Here, FIG. 6A is a plane view showing an image-added QR Code (registered trademark) 24 and FIG. 6B is a plane view showing an image-added Data Matrix (Data Code) 25.

Figure 7:
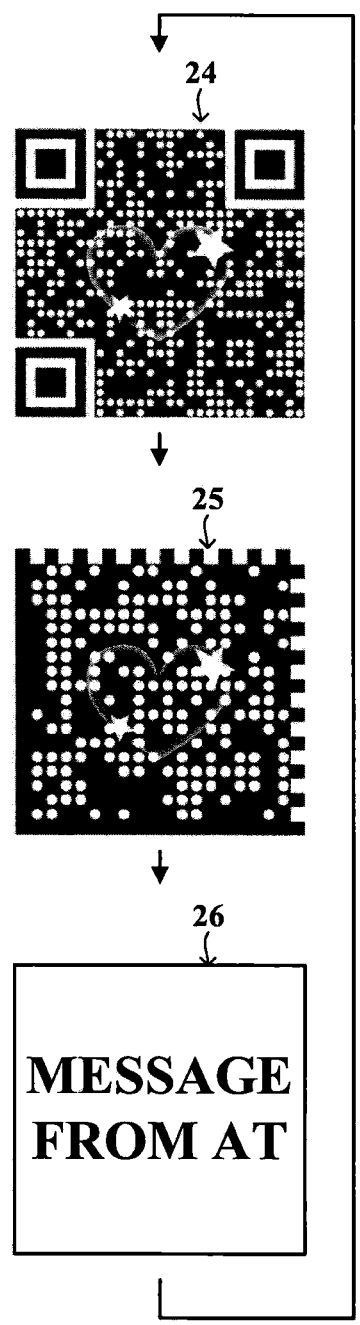
FIG. 7 is a plane view showing an exemplary image display in a modified embodiment.

In the above embodiment, the QR Code (registered trademark) 21, Data Matrix (Data Code) 22, and Aztec Code 23, all presenting the same flight reservation details, are displayed on the display unit 13 for a given period of time each by turns. However, the present invention is not restricted thereto. For example, two-dimensional codes and an image corresponding to the information presented by the two-dimensional codes can be displayed on the display unit 13 for a given period of time each by turns. For example, as shown in FIG. 7, the image-added QR Code (registered trademark) 24 shown in FIG. 6A, image-added Data Matrix (Data Code) 25 shown in FIG. 6B and presenting the same information as the image-added QR Code (registered trademark) 24, and an image 26 corresponding to the information presented by the image-added QR Code (registered trademark) and image-added Data Matrix (Data Code) can be displayed on the display unit 13 for 1.0 second each by turns. Such a switched display is preferably used in the above-mentioned domestic or overseas promotion of commercial products.

The image displayed alternately with two-dimensional codes does not need to be directly related to the information presented by the two-dimensional codes. For example, an advertizing image of the sponsor can be used.

Furthermore, the image displayed alternately with two-dimensional codes is not restricted to a still image and can be a video image.

In the above embodiment, the QR Code (registered trademark) 21, Data Matrix (Data Code) 22, and Aztec Code 23 are displayed as two-dimensional codes displayed by turns by way of example. The present invention is not restricted thereto. Other matrix type two-dimensional codes such as Code One, Array Tag, Box-figure Code, MaxiCode, Peri Code, Softstrip, CP Code, Carla Code, and Ultra Code can be displayed by turns. Furthermore, stack-type two-dimensional codes formed by stacking one dimensional codes such as such as PDF417, Code 49, Code 16K, and Coder Block can be also displayed.

Furthermore, in the above embodiment, the program executed by the CPU is stored in a ROM or the storage 12 in advance. The present invention is not restricted thereto. The program for executing the above procedure can be applied to an existing general-purpose computer so that the computer functions as the two-dimensional code display apparatus 1 according to the above embodiment.

The above program can be provided by any method. For example, the program can be stored and distributed on a computer-readable recording medium (flexible disc, CD (compact disc)—ROM, DVD (digital versatile disc)—ROM, etc.). Alternatively, the program can be stored in a storage on a network such as the Internet and downloaded from the storage.

Furthermore, if the above procedure is realized by apportionment between an OS (operation system) and application programs or by cooperation of an OS (operation system) and application programs, only the application programs can be stored in a recording medium or in a storage. Furthermore, the program can be superimposed on carrier waves to distribute them via a network. For example, the program can be posted on a bulletin board system (BBS) of a network to distribute them via the network. Then, the program can be activated and executed in a manner similar to other application programs under the control of an OS so that the above procedure is executed.

The present application is based on the Japanese Patent Application No. 2009-045627, filed on Feb. 27, 2009, of which the specification, scope of claims, and figures are all incorporated herein by reference.

Industrial Applicability

The present invention is preferably applied to communication between a noncontact IC and a reader/writer.

Legend 1 two-dimensional code display apparatus
21 QR Code (registered trademark)
22 Data Matrix (Data Code)
23 Aztec Code
24 image-added QR Code
25 image-added Data Matrix (Data Code)
26 image
2a to 2d positioning symbol
3 L-shaped frame
11 control unit
12 storage
13 display unit

The invention claimed is:

1. A two-dimensional code display apparatus comprising:
a display unit displaying two-dimensional codes presenting given information; and
a display control unit controlling display of multiple two-dimensional codes, each two-dimensional code presenting the same information in compliance with a different standard, on said display unit so that the two-dimensional codes are displayed sequentially,
wherein said display unit displays image-added two-dimensional codes in which a two-dimensional code presenting given information is superimposed on a first given image to show at least a portion of the two-dimensional code within a region where the first given image is shown,
wherein said display control unit controls display of multiple image-added two-dimensional codes, each image-added two dimensional code presenting the same information in compliance with a different standard, on said display unit so that the image-added two dimensional codes and the first given image are displayed sequentially,
wherein the image-added two-dimensional codes each comprise a first cell that is superimposed on a first portion of the first given image, and a second cell that is superimposed on a second portion of the first given image, wherein the first cell has a luminosity less than a given value and the second cell has a luminosity equal to or greater than the given value, and the first portion of the first given image has a luminosity equal to or greater than the given value and the second portion of the first given image has a luminosity less than the given value, and
wherein the given information is represented by a distribution pattern of the first portion of the first given image and the second cell, and of the second portion of the first given image and the first cell.

2. The two-dimensional code display apparatus according to claim 1, wherein said display control unit controls display of multiple two-dimensional codes, each two-dimensional code presenting the same information in compliance with a different standard, and a second given image on said display unit so that the two-dimensional codes and the second given image are displayed sequentially.

3. The two-dimensional code display apparatus according to claim 1, wherein said display control unit controls display of multiple two-dimensional codes, each two-dimensional code presenting the same information in compliance with a different standard, and an image corresponding to the information presented by the two-dimensional codes on said display unit so that the two-dimensional codes and the image are displayed sequentially.

4. The two-dimensional code display apparatus according to claim 1 wherein each of the multiple two-dimensional codes is displayed for a predetermined time and wherein the predetermined time is greater than or equal to a time period sufficient for a two-dimensional code reader working with each standard to read the information presented by each of the multiple two-dimensional codes displayed on the display unit.

5. The two-dimensional code display apparatus according to claim 1 wherein a sequence of displaying the multiple two-dimensional codes on the display unit is repeated.

6. A two-dimensional code display method controlling display of multiple two-dimensional codes, each two-dimensional code presenting the same information in compliance with a different standard, on a display unit so that the two-dimensional codes are displayed sequentially,
wherein said display unit displays image-added two-dimensional codes in which a two-dimensional code presenting given information is superimposed on a first given image to show at least a portion of the two-dimensional code within a region where the first given image is shown,
wherein display of multiple image-added two-dimensional codes is controlled, each of the multiple image-added two dimensional code presenting the same information in compliance with a different standard, on said display unit so that the image-added two dimensional codes and the given image are displayed sequentially,
wherein the image-added two-dimensional codes each comprise a first cell that is superimposed on a first portion of the first given image, and a second cell that is superimposed on a second portion of the first given image, wherein the first cell has a luminosity less than a given value and the second cell has a luminosity equal to or greater than the given value, and the first portion of the first given image has a luminosity equal to or greater than the given value and the second portion of the first given image has a luminosity less than the given value, and
wherein the given information is represented by a distribution pattern of the first portion of the first given image and the second cell, and of the second portion of the first given image and the first cell.

7. A non-transitory computer-readable recording medium recording a program allowing a computer comprising a display unit capable of displaying two-dimensional codes presenting given information to execute control on display of multiple two-dimensional codes, each two-dimensional code presenting the same information in compliance with a different standard, on said display unit so that the two-dimensional codes are displayed by sequentially, wherein said display unit displays image-added two-dimensional codes in which a two-dimensional code presenting given information is superimposed on a first given image to show at least a portion of the two-dimensional code within a region where the first given image is shown, and wherein display of multiple image-added two-dimensional codes, each image-added two dimensional code presenting the same information in compliance with a different standard, on said display unit so that the image-added two dimensional codes and the first given image are displayed sequentially, wherein the image-added two-dimensional codes each comprise a first cell that is superimposed on a first portion of the first given image, and a second cell that is superimposed on a second portion of the first given image, wherein the first cell has a luminosity less than a given value and the second cell has a luminosity equal to or greater than the given value, and the first portion of the first given image has a luminosity equal to or greater than the given value and the second portion of the first given image has a luminosity less than the given value, and wherein the given information is represented by a distribution pattern of the first portion of the first given image and the second cell, and of the second portion of the first given image and the first cell.

\* \* \* \* \*